(12) United States Patent
Zhai et al.

(10) Patent No.: US 12,271,083 B2
(45) Date of Patent: Apr. 8, 2025

(54) DIMMING MODULE AND METHOD FOR MANUFACTURING THE SAME, AND DIMMING GLASS

(71) Applicants: Beijing BOE Sensor Technology Co., Ltd., Beijing (CN); BOE Technology Group Co., Ltd., Beijing (CN)

(72) Inventors: Deshen Zhai, Beijing (CN); Chunlei Wang, Beijing (CN); Sikai Zhang, Beijing (CN); Juan Chen, Beijing (CN); Ying Wang, Beijing (CN); Changyin Wang, Beijing (CN); Peng Liang, Beijing (CN); Xiaoqian Ju, Beijing (CN); Xiaolong Wu, Beijing (CN); Yongzhong Zhang, Beijing (CN); Jing Pang, Beijing (CN)

(73) Assignees: BEIJING BOE SENSOR TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/022,769

(22) PCT Filed: Feb. 28, 2022

(86) PCT No.: PCT/CN2022/078421
§ 371 (c)(1),
(2) Date: Feb. 23, 2023

(87) PCT Pub. No.: WO2023/159607
PCT Pub. Date: Aug. 31, 2023

(65) Prior Publication Data
US 2024/0272490 A1 Aug. 15, 2024

(51) Int. Cl.
*G02F 1/1343* (2006.01)
*G02F 1/133* (2006.01)
(Continued)

(52) U.S. Cl.
CPC .... *G02F 1/134309* (2013.01); *G02F 1/13306* (2013.01); *G02F 1/133305* (2013.01);
(Continued)

(58) Field of Classification Search
CPC ..................................................... G02F 1/1343
See application file for complete search history.

(56) References Cited

U.S. PATENT DOCUMENTS

| 9,606,353 B2 | 3/2017 | Lee et al. |
| 10,606,387 B2 | 3/2020 | Tang |

(Continued)

FOREIGN PATENT DOCUMENTS

| CN | 106773204 A | 5/2017 |
| CN | 107728848 A | 2/2018 |

(Continued)

OTHER PUBLICATIONS

Written Opinion mailed on Jul. 4, 2022, in corresponding PCT/CN2022/078421, 4 pages.

*Primary Examiner* — Sang V Nguyen
(74) *Attorney, Agent, or Firm* — XSENSUS LLP

(57) ABSTRACT

A dimming module and method for manufacturing the same, and a dimming glass, relate to the field of smart glass technology. The dimming module includes: a first dimming structure (10) and a second dimming structure (20). Each of the first dimming structure (10) and the second dimming structure (20) includes a first substrate (1), a second substrate (2) and a liquid crystal layer (3), and a first flexible circuit board (4) and a second flexible circuit board (5). The first substrate (1) is provided with a first binding area (11), and a first electrode (6) on one side facing the liquid crystal layer (3). The second substrate (2) is provided with a second binding area (21), and a plurality of second electrodes (7) on one side facing the liquid crystal layer (3).

14 Claims, 8 Drawing Sheets

(51) Int. Cl.
*G02F 1/1333* (2006.01)
*G02F 1/1337* (2006.01)
*G02F 1/1347* (2006.01)

(52) U.S. Cl.
CPC .......... *G02F 1/1337* (2013.01); *G02F 1/1347* (2013.01); *G02F 2203/01* (2013.01)

(56) References Cited

U.S. PATENT DOCUMENTS

| | | | |
|---|---|---|---|
| 2016/0054631 A1 | 2/2016 | Lee et al. | |
| 2016/0370657 A1* | 12/2016 | Wu | G02F 1/133723 |
| 2019/0267434 A1* | 8/2019 | Liu | G06F 1/1637 |
| 2019/0384433 A1 | 12/2019 | Tang | |
| 2022/0043313 A1 | 2/2022 | Wang et al. | |
| 2022/0075221 A1* | 3/2022 | Wang | G02F 1/13338 |
| 2022/0373835 A1* | 11/2022 | Chen | G02F 1/134309 |

FOREIGN PATENT DOCUMENTS

| | | |
|---|---|---|
| CN | 111624800 A | 9/2020 |
| CN | 111965878 A | 11/2020 |
| CN | 111999926 A | 11/2020 |
| CN | 113093444 A | 7/2021 |
| CN | 113156719 A | 7/2021 |
| CN | 113253525 A | 8/2021 |
| CN | 215576038 U | 1/2022 |
| WO | 2022/001450 A1 | 1/2022 |

* cited by examiner

DIMMING MODULE AND METHOD FOR MANUFACTURING THE SAME, AND DIMMING GLASS

CROSS-REFERENCE TO RELATED APPLICATIONS

The present disclosure is the U.S. National phase application of International Application No. PCT/CN2022/078421, filed on Feb. 28, 2022, the entire contents of which are hereby incorporated by reference in its entirety.

TECHNICAL FIELD

The present disclosure relates to the field of smart glass technology, and in particular, to a dimming module and a method for manufacturing the dimming module, and a dimming glass.

BACKGROUND

At present, in the development process of dimming glass technology, with the increasing demand of users, the window-shade dimming glass has gradually emerged. The window-shade dimming glass refers to a glass having a plurality of independent strip-like areas with adjustable light transmittance in order to achieve the effect of window-shades through the independent control of the plurality of strip-like areas. In the process of the use of the window-shade dimming glass, the inventor found that when the light transmittance of the window-shade dimming glass was adjusted to the minimum, it still could not meet the needs of some users.

It should be noted that the above information disclosed in the background section is intended only to enhance the understanding of the background of the present disclosure and may therefore include information that does not constitute prior art known to those of ordinary skill in the art.

SUMMARY

The purpose of the present disclosure is to provide a dimming module and a method for manufacturing the dimming module, and a dimming glass.

According to a first aspect of the present disclosure, there is provided a dimming module, including: a first dimming structure and a second dimming structure distributed in a laminated manner;
  each of the first dimming structure and the second dimming structure includes: a first substrate, a second substrate, a liquid crystal layer between the first substrate and the second substrate, a first flexible circuit board, and a second flexible circuit board;
  where the first substrate is provided with a first binding area, and a first electrode on one side of the first substrate facing the liquid crystal layer, the first electrode being a planar structure in one piece, one end of the first flexible circuit board being bound to the first binding area to be electrically connected to the first electrode; and the second substrate is provided with a second binding area, and a plurality of second electrodes distributed in an array on one side of the second substrate facing the liquid crystal layer, the plurality of second electrodes extending in a column direction, one end of the second flexible circuit board being bound to the second binding area to be electrically connected to the plurality of the second electrodes; and
  in a lamination direction, the plurality of second electrodes in the first dimming structure are in a one-to-one correspondence with the plurality of second electrodes in the second dimming structure.

According to a second aspect of the present disclosure, there is provided a method for manufacturing a dimming module, including:
  manufacturing a first dimming structure and a second dimming structure, each of the first dimming structure and the second dimming structure including: a first substrate, a second substrate, a liquid crystal layer between the first substrate and the second substrate, a first flexible circuit board, and a second flexible circuit board, where: the first substrate is provided with a first binding area, and a first electrode on one side of the first substrate facing the liquid crystal layer, the first electrode being a planar structure in one piece, one end of the first flexible circuit board being bound to the first binding area to be electrically connected to the first electrode; and the second substrate is provided with a second binding area, and a plurality of second electrodes distributed in an array on one side of the second substrate facing the liquid crystal layer, the plurality of second electrodes extending in a column direction, one end of the second flexible circuit board being bound to the second binding area to be electrically connected to the plurality of the second electrodes; and
  laminating and bonding the first dimming structure and the second dimming structure, where, in a lamination direction, the plurality of second electrodes in the first dimming structure are in a one-to-one correspondence with the plurality of second electrodes in the second dimming structure.

According to a third aspect of the present disclosure, there is provided a dimming glass, including the dimming module as described in the first aspect.

It should be understood that the foregoing general description and the following detailed description are exemplary and explanatory only and cannot limit the present disclosure.

BRIEF DESCRIPTION OF THE DRAWINGS

The accompanying drawings herein, which are incorporated in and constitute a part of the specification, illustrate embodiments consistent with the present disclosure, and serve to explain the principle of the present disclosure together with the description. Obviously, the drawings in the following description are only some embodiments of the present disclosure, and for those ordinary skilled in the art, other drawings may also be obtained from these drawings without creative effort.

DETAILED DESCRIPTION

Figure 1:
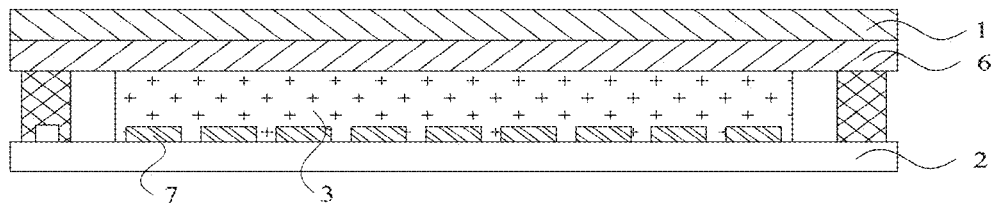
FIG. 1 is a structural schematic diagram of a dimming structure provided by the related art.

Exemplary embodiments will now be described more fully with reference to the accompanying drawings. However, the exemplary embodiments can be implemented in various forms and should not be construed as being limited to the examples set forth here; rather, these embodiments are provided so that this disclosure will be comprehensive and complete, and the concept of exemplary embodiments will be fully conveyed to those skilled in the art. The same reference numerals in the figures represent the same or similar structures, and thus their detailed descriptions will be omitted. Further, the figures are merely schematic illustrations of the present disclosure and are not necessarily drawn to scale.

Although relative terms are used in the present description, for example, "on" and "below" are used to describe the relative relationship of one assembly denoted by a reference symbol to another assembly, these terms are used in the present description for convenience only, e.g., according to the direction of examples depicted in the figures. It can be appreciated that if the device denoted by a reference symbol is turned upside down, the assembly described as "above" will become the assembly "below". When a structure is "on" other structures, it may mean that the structure is integrally formed on other structures, or that the structure is "directly" provided on other structures, or that the structure is "indirectly" provided on other structures through another structure.

The terms "a", "an", "the", "said" and "at least one" are used to indicate the presence of one or more elements/components/etc. The terms "comprise" and "include" are used to indicate an open-ended inclusion and mean that additional elements/components/etc. may be present in addition to listed elements/components/etc. The terms "first", "second", "third" and the like are used as tags only and are not intended to limit the number of objects after them.

Figure 2:
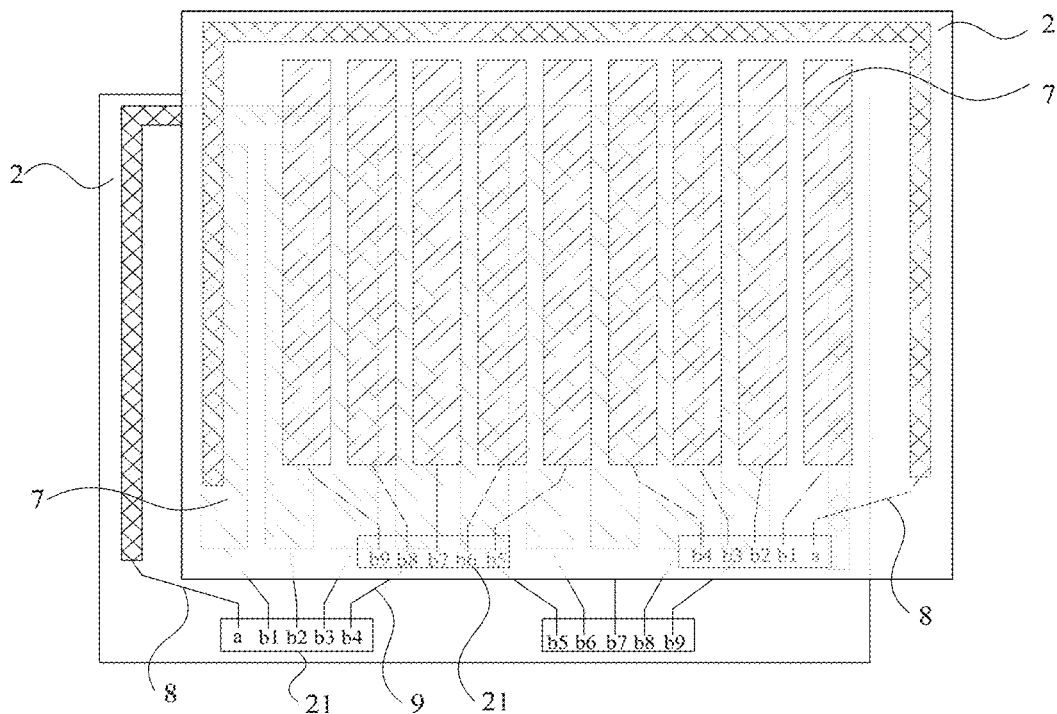
FIG. 2 is a schematic diagram of a structure of a dimming module provided by embodiments of the present disclosure in conjunction with the related art.

In the related art, as shown in FIGS. 1 and 2, the dimming structure includes a first substrate 1, a second substrate 2, a liquid crystal layer 3 disposed between the first substrate 1 and the second substrate 2. The first substrate 1 and the second substrate 2 are bonded through a conductive adhesive. There is a first electrode 6 which is a planar structure in one piece on the surface of the first substrate 1 close to the liquid crystal layer 3. The second substrate 2 has a central area and a peripheral area. The surface of the second substrate 2 in the central area which is close to the liquid crystal layer 3 has a plurality of second electrodes 7 in the form of strips. The peripheral area has a second binding area 21, a first conductive wire 8 extending from the second binding area 21 to the conductive adhesive and a second conductive wire 9 extending from the second binding area 21 to the second electrode 7. Here, the plurality of second electrodes 7 on the second substrate 2 are made by a patterning process.

In order to improve the shading effect of the window-shade dimming glass, the inventors proposed to manufacture the window-shade dimming glass using a double-layer dimming structure. However, as shown in FIG. 2, when the two dimming structures are combined, the connection point a of the first conductive wire 8 of the first dimming structure 10 in the second binding area 21 is misaligned with the connection point a of the first conductive wire 8 of the second dimming structure 20 in the second binding area 21, so that the circuit is complicated when the same driving circuit is used to connect the two first conductive wires 8. In addition, the connection points (e.g., b1 and b9) of the second conductive wires 9 connected to the two second electrodes 7 in two dimming structures are also misaligned in the binding area, the two second electrodes 7 having orthographic projections overlap in the thickness direction, thus increasing the complexity of the circuit when synchronizing the regulation of the two second electrodes 7 whose orthographic projections overlap.

Figure 3:
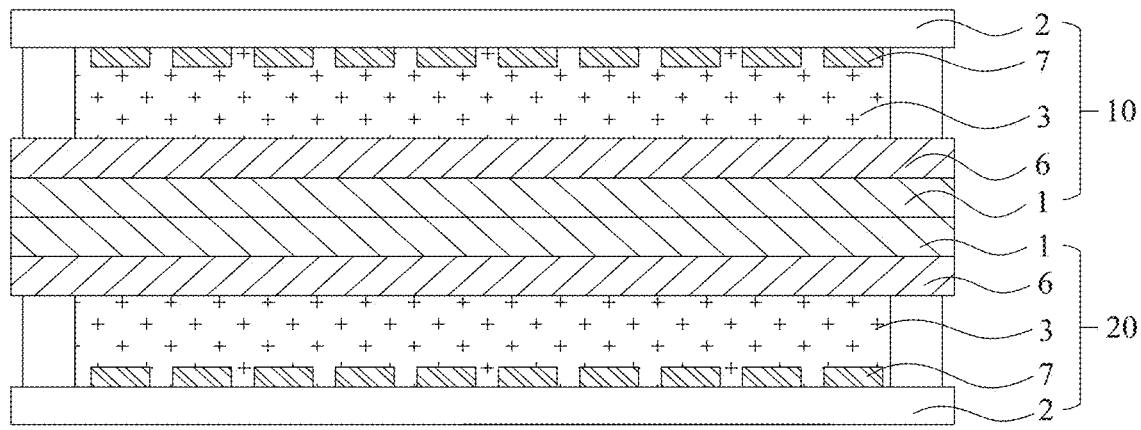
FIG. 3 is a schematic diagram of a cross-sectional structure of a dimming module provided by embodiments of the present disclosure.
Figure 4:
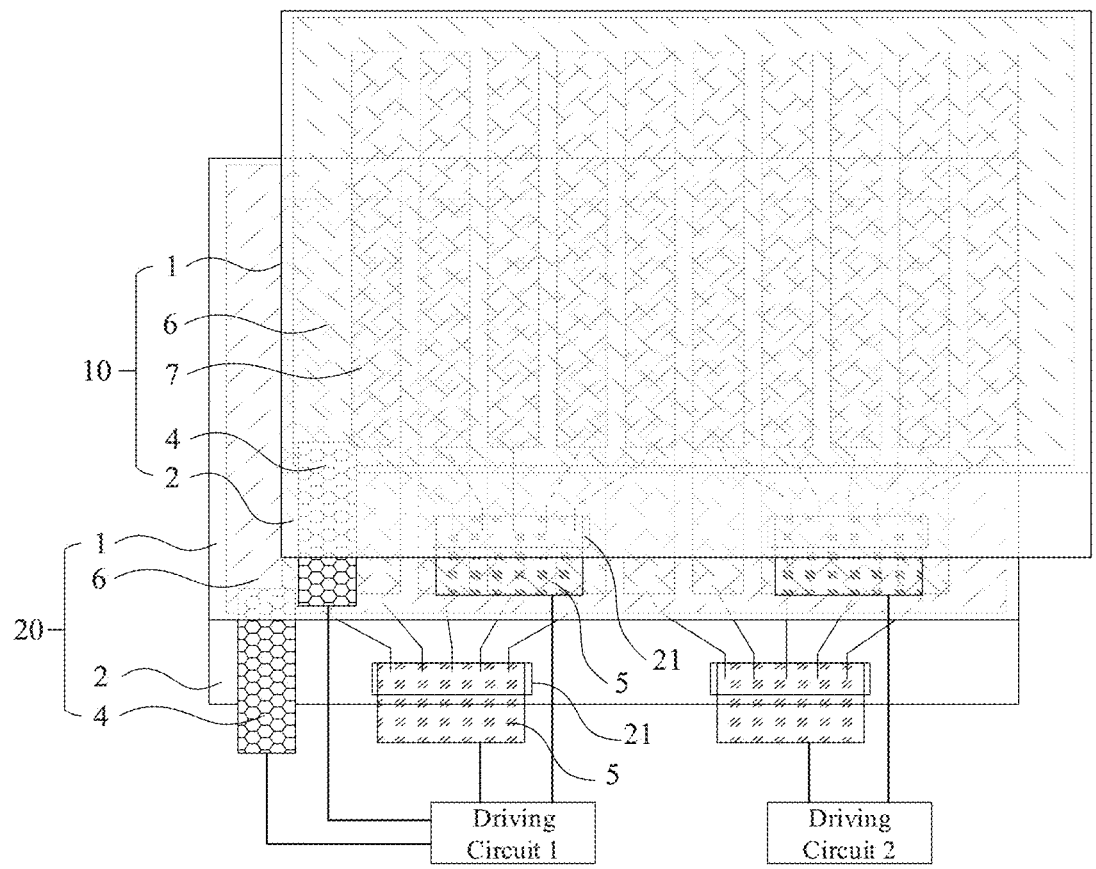
FIG. 4 is a schematic diagram of a structure of a dimming module provided by embodiments of the present disclosure.

The embodiments of the present disclosure provide a dimming module. As shown in FIGS. 3 and 4, the dimming module includes a first dimming structure 10 and a second dimming structure 20, with the first dimming structure 10 and the second dimming structure 20 distributed in a laminated manner. The first dimming structure 10 and the second dimming structure 20 each includes a first substrate 1, a second substrate 2, a liquid crystal layer 3 disposed between the first substrate 1 and the second substrate 2, and a first flexible circuit board 4 and a second flexible circuit board 5.

The first substrate 1 has a first binding area 11, and one side of the first substrate 1 facing the liquid crystal layer 3 is provided with a first electrode 6. The first electrode 6 is a planar structure in one piece. One end of the first flexible circuit board 4 is bound to the first binding area 11 to electrically connect to the first electrode 6. The second substrate 2 has a second binding area 21, and one side of the second substrate 2 facing the liquid crystal layer 3 is provided with a plurality of second electrodes 7 distributed in an array. The second electrodes 7 extend along the column direction. The second flexible circuit board 5 is bound to the second binding area 21 to electrically connect to the plurality of second electrodes 7. In the lamination direction of the first dimming structure 10 and the second dimming structure 20, the plurality of second electrodes 7 in the first dimming structure 10 are in a one-to-one correspondence with the plurality of second electrodes 7 in the second dimming structure 20.

In the embodiments of the present disclosure, the first dimming structure 10 and the second dimming structure 20 are distributed in a laminated manner to achieve a double-layer dimming structure, so that the shading effect can be maximized. For the first dimming structure 10 or the second dimming structure 20, the included first substrate 1 is bounded to the first flexible circuit board 4 through the first binding area 11 separately provided, realizing the electrical connection of the first electrode 6 and the second electrode 7 with the corresponding flexible circuit board separately, thus the connection of the first flexible circuit board 4 of the first dimming structure 10 and the first flexible circuit board 4 of the second dimming structure 20 with the same driving circuit (formed on the printed circuit board (PCB)) can be simplified, and the problem of misalignment of the electrical connection points of the plurality of second electrodes 7 of the first dimming structure 10 and the plurality of second electrodes 7 of the second dimming structure 20 can be avoided, thereby facilitating the synchronous drive regulation of the two second electrodes 7 corresponding to each other of the first dimming structure 10 and the second dimming structure 20, and improving the dimming effect of the dual dimming structure.

In addition, the first substrate 1 is provided with a separate first binding area 11, avoiding to set the conductive adhesive on the first substrate 1 and the second substrate 2, so that the area occupied by the first electrode 6 and the second electrode 7 can be appropriately increased, which in turn increases the dimming area of the dimming structure.

After the first dimming structure 10 and the second dimming structure 20 are laminated, the orthographic projections of the two second electrodes 7 corresponding to each other on the first substrate 1 of the first dimming structure 10 overlap. When the first dimming structure 10 and the second dimming structure 20 are laminated, the substrate in the first dimming structure 10 and the substrate in the second dimming structure 20 are bonded by transparent adhesive to avoid the blocking of the light beam. Of course, the substrate in the first dimming structure 10 and the substrate in the second dimming structure 20 can also be a one-piece structure, that is, the dimming module according to the embodiments of the present disclosure includes: three layers of substrates, the liquid crystal layer 3 disposed between the upper-layer substrate and the middle-layer substrate, and the liquid crystal layer 3 disposed between the middle-layer substrate and the bottom-layer substrate. The side of the upper-layer substrate close to the middle-layer substrate, two sides of the middle-layer substrate, and the side of the bottom-layer substrate close to the middle-layer substrate all are provided with electrodes.

The shape of the first substrate 1, the liquid crystal layer 3, and the second substrate 2 can be circular or rectangular. The material of the first substrate and the second substrate is glass or Polyethylene terephthalate (PET). Of course, it can also be Polycarbonate (PC) or Polymethyl methacrylate (PMMA). The liquid crystal layer 3 is a liquid crystal molecular layer or a dye liquid crystal layer 3. In case the liquid crystal layer 3 is the dye liquid crystal layer 3, the liquid crystal layer 3 includes liquid crystal molecules and dichroic dye molecules, and when the liquid crystal molecules rotate, the dichroic dye molecules rotate simultaneously, so that the dimming structure can be switched between the bright state (light transmission mode) and the dark state (shading mode).

The plurality of second electrodes 7 may be made by a patterning process. The plurality of second electrodes 7 are distributed in an array, each second electrode 7 extending in a column direction of the array and distributed in a row direction of the array. The plurality of second electrodes 7 can be arranged in a row, or of course in multiple rows, as long as the effect of window-shades can be achieved, which is not limited by the embodiments of the present disclosure. For example, as shown in FIG. 4, the second substrate 2 is rectangular in shape, the plurality of second electrodes 7 are arranged in one row, and the length direction of the second electrodes 7 is perpendicular to one side edge of the second substrate 2.

The material of the first electrode 6 and the second electrode 7 can be IndiumTinOxide (ITO). Of course, the material of the first electrode 6 and the second electrode 7 can also be Al-doped Zinc Oxide (AZO), or Gallium-doped Zinc Oxide (GZO). In the bright state of the liquid crystal layer 3, AZO or GZO can not only ensure the transmission rate of visible light, but also achieve the blocking of infrared light, so as to reduce the temperature rise of the liquid crystal layer 3 due to the irradiation of infrared light.

In actual use, taking the first dimming structure 10 as an example, when the voltage is not applied simultaneously to the first electrode 6 and any of the second electrodes 7, the liquid crystal molecules and dichroic dye molecules in the area of the liquid crystal layer 3 corresponding to the second electrode 7 do not rotate, and the first dimming structure 10 maintains the current state (one of the bright state and dark state) in the area corresponding to the second electrode 7. When the voltage is applied simultaneously to the first electrode 6 and any of the second electrodes 7, the liquid crystal molecules and dichroic dye molecules in the area of the liquid crystal layer 3 corresponding to the second electrode 7 rotate, and the first dimming structure 10 is adjusted to the other state of the bright state and the dark state in the area corresponding to the second electrode 7.

In the embodiments of the present disclosure, the first dimming structure 10 and the second dimming structure 20 each further includes a first orientation layer and a second orientation layer. The first orientation layer is disposed between the liquid crystal layer 3 and the first substrate 1, and the second orientation layer is disposed between the liquid crystal layer 3 and the second substrate 2.

The first orientation layer and the second orientation layer are used to achieve the twisting of the liquid crystal molecules included in the liquid crystal layer 3, for example, the first orientation layer and the second orientation layer can make the liquid crystal molecules included in the liquid crystal layer 3 twist by 90 degrees, 180 degrees, 270 degrees, etc.

Before the first dimming structure 10 and the second dimming structure 20 are laminated, the orientation angle of the first orientation layer of the first dimming structure 10 and the orientation angle of the first orientation layer of the second dimming structure 20 can be the same or, of course, different, as long as the first dimming structure 10 and the second dimming structure 20 are laminated to improve the range of light transmittance. When the orientation angle of the first orientation layer of the first dimming structure 10 and the orientation angle of the first orientation layer of the second dimming structure 20 are the same, then the first orientation layer of the first dimming structure 10 and the first orientation layer of the second dimming structure 20 can be sequentially manufactured through one process line. When the orientation angle of the first orientation layer of the first dimming structure 10 is different from the orientation angle of the first orientation layer of the second dimming structure 20, the first orientation layer of the first dimming structure 10 and the first orientation layer of the second dimming structure 20 can be manufactured through two process lines respectively.

The orientation angle described above is the angle between the orientation direction of the orientation layer and a straight line as the reference line. The reference line of the first dimming structure 10 and the reference line of the second dimming structure 20 are the same.

In the embodiments of the present disclosure, the first dimming structure 10 and the second dimming structure 20 may be laminated symmetrically. For example, as shown in FIG. 3, the first substrate 1 of the first dimming structure 10 is located on the side of the first dimming structure 10 close to the second dimming structure 20, and the first substrate 1 of the second dimming structure 20 is located on the side of the second dimming structure 20 close to the first dimming structure 10. In this case, the second substrate 2 of the first dimming structure 10 is located on the side of the first dimming structure 10 away from the second dimming structure 20, and the second substrate 2 of the second dimming structure 20 is located on the side of the second dimming structure 20 away from the first dimming structure 10. Alternatively, the first substrate 1 of the first dimming structure 10 is located on the side of the first dimming structure 10 away from the second dimming structure 20, and the first substrate 1 of the second dimming structure 20 is located on the side of the second dimming structure 20 away from the first dimming structure 10. In this case, the second substrate 2 of the first dimming structure 10 is located on the side of the first dimming structure 10 close to the second dimming structure 20, and the second substrate 2 of the second dimming structure 20 is located on the side of the second dimming structure 20 close to the first dimming structure 10.

Of course, the first dimming structure 10 and the second dimming structure 20 can also be sequentially laminated. For example, the first substrate 1 of the first dimming structure 10 is located on the side of the first dimming structure 10 close to the second dimming structure 20, and the second substrate 2 of the second dimming structure 20 is located on the side of the second dimming structure 20 is close to the first dimming structure 10. In this case, the second substrate 2 of the first dimming structure 10 is located on the side of the first dimming structure 10 away from the second dimming structure 20, and the first substrate 1 of the second dimming structure 20 is located of the second dimming structure 20 away from the first dimming structure 10. Alternatively, the first substrate 1 of the first dimming structure 10 is located on the side of the first dimming structure 10 away from the second dimming structure 20, and the first substrate 1 of the second dimming structure 20 is located on the side of the second dimming structure 20 close to the first dimming structure 10. In this case, the second substrate 2 of the first dimming structure 10 is located on the side of the first dimming structure 10 close to the second dimming structure 20, and the second substrate 2 of the second dimming structure 20 is located on the side of the second dimming structure 20 away from the first dimming structure 10.

Based on the above-mentioned situation that the substrate in the first dimming structure 10 and the substrate in the second dimming structure 20 can also be a one-piece structure, when the first dimming structure 10 and the second dimming structure 20 are laminated symmetrically, the first substrate 1 of the first dimming structure 10 and the first substrate 1 of the second dimming structure 20 are integrated into an integral whole, or the second substrate 2 of the first dimming structure 10 and the second substrate 2 of the second dimming structure 20 are integrated into an integral whole; when the first dimming structure 10 and the second dimming structure 20 are laminated sequentially, the first substrate 1 of the first dimming structure 10 and the second substrate 2 of the second dimming structure 20 are integrated into an integral whole, or the second substrate 2 of the first dimming structure 10 and the first substrate 1 of the second dimming structure 20 are integrated into an integral whole.

In the embodiments of the present disclosure, taking the first dimming structure 10 and the second dimming structure 20 laminated symmetrically as an example, the orientation angle of the first orientation layer of the first dimming structure 10 and the orientation angle of the first orientation layer of the second dimming structure 20 both are 45 degrees or 135 degrees before the first dimming structure 10 and the second dimming structure 20 are laminated. When the first substrate 1 of the first dimming structure 10 is laminated with the first substrate 1 of the second dimming structure 20, the orientation of the liquid crystal molecules close to the first substrate 1 in the first dimming structure 10 is perpendicular to the orientation of the liquid crystal molecules close to the first substrate 1 in the second dimming structure 20. When the second substrate 2 of the first dimming structure 10 is laminated with the second substrate 2 of the second dimming structure 20, the orientation of the liquid crystal molecules close to the second substrate 2 in the first dimming structure 10 is perpendicular to the orientation of the liquid crystal molecules close to the second substrate 2 in the second dimming structure 20. In this way, the shading effect after lamination can be better ensured.

In some embodiments, taking the first dimming structure 10 as an example, as the size of the dimming module increases, the first dimming structure 10 includes more second electrodes 7 on the second substrate 2. In this case, in order to facilitate the electrical connection of a plurality of second electrodes 7 with the second flexible circuit board 5, as shown in FIG. 4, the first dimming structure 10 includes a plurality of second flexible circuit boards 5, the second substrate 2 has a plurality of second binding area 21 in a one-to-one correspondence with the plurality of second flexible circuit boards 5, the plurality of second electrodes 7 are divided into a plurality of groups of second electrodes 7 in a one-to-one correspondence with the plurality of second flexible circuit boards 5, and one second flexible circuit board 5 is bound to the corresponding second binding area 21 to be electrically connected to the corresponding group of second electrodes 7.

The second substrate 2 has conductive wires in a one-to-one correspondence with the plurality of second electrodes 7, and one end of each conductive wire is electrically connected to the end of the corresponding second electrode 7 and the other end extends to the second binding area 21 corresponding to the second electrode 7. In this way, the length of the conductive wire between the second electrode 7 and the corresponding second binding area 21 can be shortened, simplifying the complexity of wiring on the second substrate 2. In addition, by controlling the number of second electrodes 7 included in each group of second electrodes 7, the structure of the corresponding second flexible circuit board 5 can be simplified to avoid the situation where the second flexible circuit board 5 is too wide.

In the second dimming structure 20, the number of second flexible circuit boards 5, the number of second binding areas 21, the number of groups of second electrodes 7, and the number of second electrodes 7 in each group are the same as those of the first dimming structure 10, and therefore, the second flexible circuit board 5 in the second dimming structure 20 will not be repeated.

In adjusting the light transmittance of a certain area of the first dimming structure 10 and the light transmittance of the corresponding area on the second dimming structure 20, as shown in FIG. 4, the second flexible circuit boards S to which the plurality of groups of second electrodes 7 in the first dimming structure 10 are connected are used to electrically connect to different driving circuit (formed on the PCB), and the second flexible circuit boards 5 to which the two groups of second electrodes 7 corresponding to each other in the first dimming structure and the second dimming structure 20 are electrically connected to the same driving circuit. In this way, synchronous driving of the two groups of second electrodes 7 corresponding to each other in the first dimming structure 10 and the second dimming structure 20 can be achieved by the same driving circuit, i.e., the zonal synchronous regulation of the first dimming structure 10 and the second dimming structure 20 is ensured, and the structure of the driving circuit is simplified.

In the embodiments of the present disclosure, the first flexible circuit board 4 of the first dimming structure 10 and the first flexible circuit board 4 of the second dimming structure 20 need to be powered on or off synchronously. In this case, in order to facilitate the synchronous control of the first flexible circuit board 4 of the first dimming structure 10 and the first flexible circuit board 4 of the second dimming structure 20, as shown in FIG. 4, the first flexible circuit board 4 of the first dimming structure 10, and the first flexible circuit board 4 of the second dimming structure 20 are electrically connected to the same driving circuit (formed on the PCB).

When connected to the same driving circuit, in order to avoid the first flexible circuit board 4 of the first dimming structure 10 or the first flexible circuit board 4 of the second dimming structure 20 to bend, the first binding area 11 in the first dimming structure 10 and the second binding area 21 in the second dimming structure 20 have an overlapping area in the direction of the thickness of the dimming module.

Of course, under the premise of allowing the first flexible circuit board 4 of the first dimming structure 10 or the first flexible circuit board 4 of the second dimming structure 20 to bend, the first binding area 11 in the first dimming structure 10 and the second binding area 21 in the second dimming structure 20 may also be staggered in the thickness direction of the dimming module. That is, there is no overlapping area between the first binding area 11 in the first dimming structure 10 and the second binding area 21 in the second dimming structure 20 in the thickness direction of the dimming module.

Here, the way of forming the second binding area 21 on the second substrate 2 can be referred to related technology, which is not limited by the embodiments of the present disclosure. The way of forming the first binding area 11 on the first substrate 1 is explained below.

Figure 5:
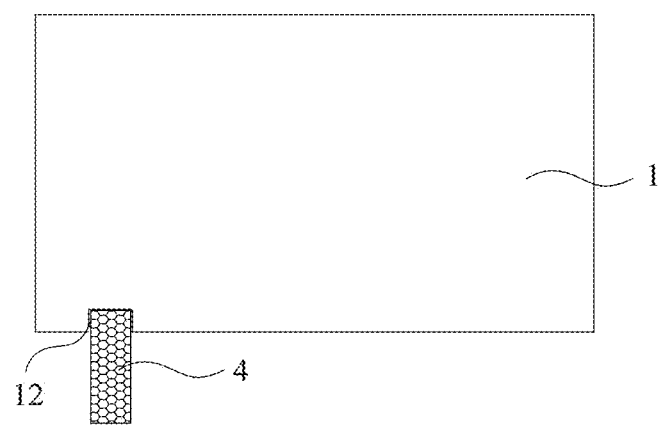
FIG. 5 is a schematic diagram of a structure of a first substrate provided by embodiments of the present disclosure.
Figure 6:
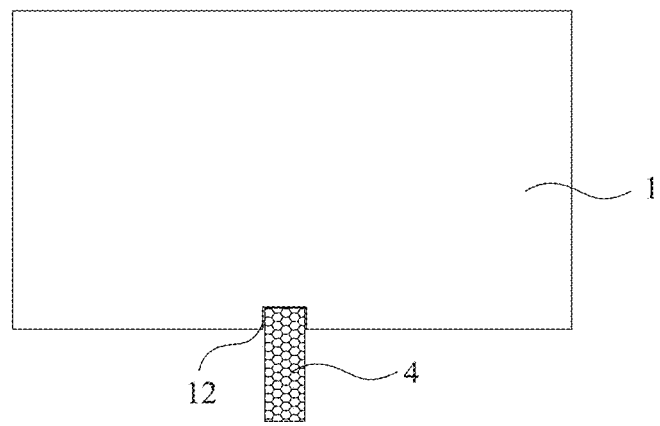
FIG. 6 is a schematic diagram of a structure of another first substrate provided by embodiments of the present disclosure.

In some embodiments, as shown in FIG. 5 or FIG. 6, the edge of the first substrate 1 has a notch 12, the first binding area 11 is formed on the first substrate 1 at the notch 12, and one end of the first flexible circuit board 4 is bound within the notch 12. In this way, after the first flexible circuit board 4 is bound to the first substrate 1, the overall thickness of the first substrate 1 will not be increased.

When the notch 12 extends to the first electrode 6 in the thickness direction of the dimming module, i.e., the first electrode 6 is exposed at the notch 12, the first binding area 11 is directly formed on the first electrode 6, and the first flexible circuit board 4 is directly bound to the first electrode 6. Alternatively, when the notch 12 does not extend to the first electrode 6 in the thickness direction of the dimming module, conductive wires are arranged between the first electrode 6 and the wall of the notch 12, and after the first flexible circuit board 4 is bound at the notch 12, it is electrically connected to the first electrode 6 through the conductive wires.

When the first dimming structure 10 and the second dimming structure 20 are laminated, in order to ensure that the notch 12 of the first substrate 1 in the first dimming structure and the notch 12 of the first substrate 1 in the second dimming structure 20 have an overlapping area in the thickness direction of the dimming module, the position of the notch 12 of the first substrate 1 in the first dimming structure 10, and the position of the notch 12 of the first substrate 1 in the second dimming structure 20 can be determined according to the lamination of the first dimming structure 10 and the second dimming structure 20.

Figure 7:
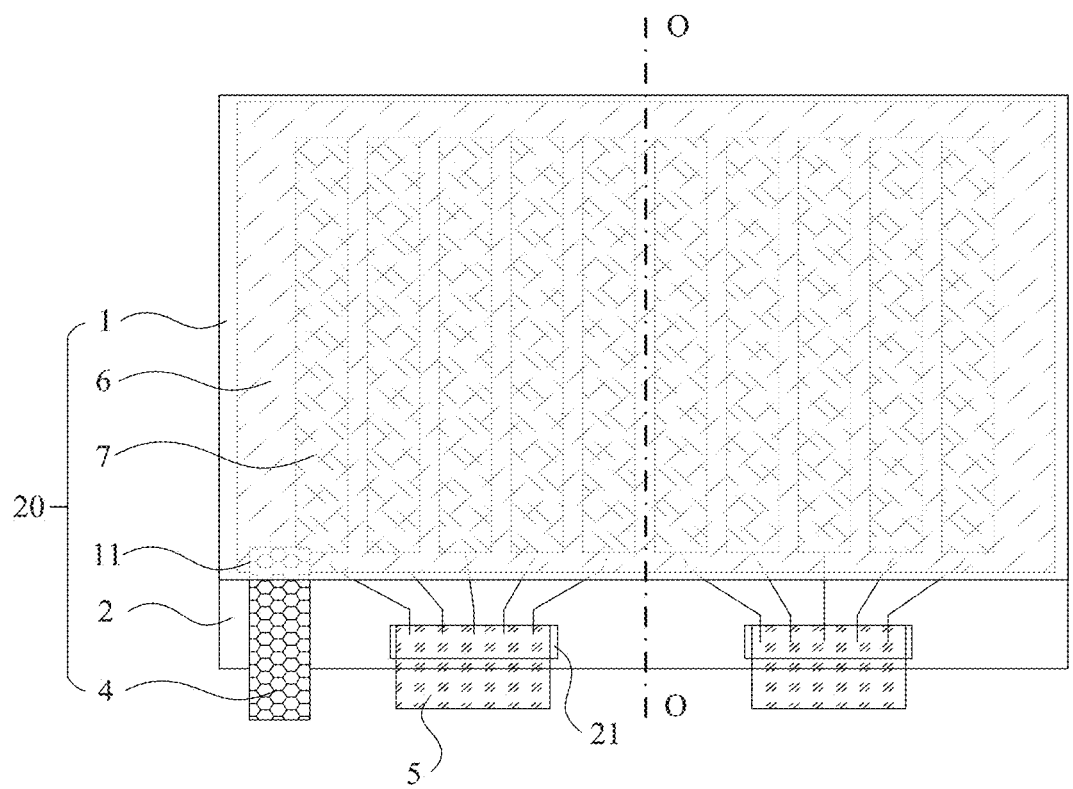
FIG. 7 is a schematic diagram of a structure of a second dimming structure provided by embodiments of the present disclosure.
Figure 8:
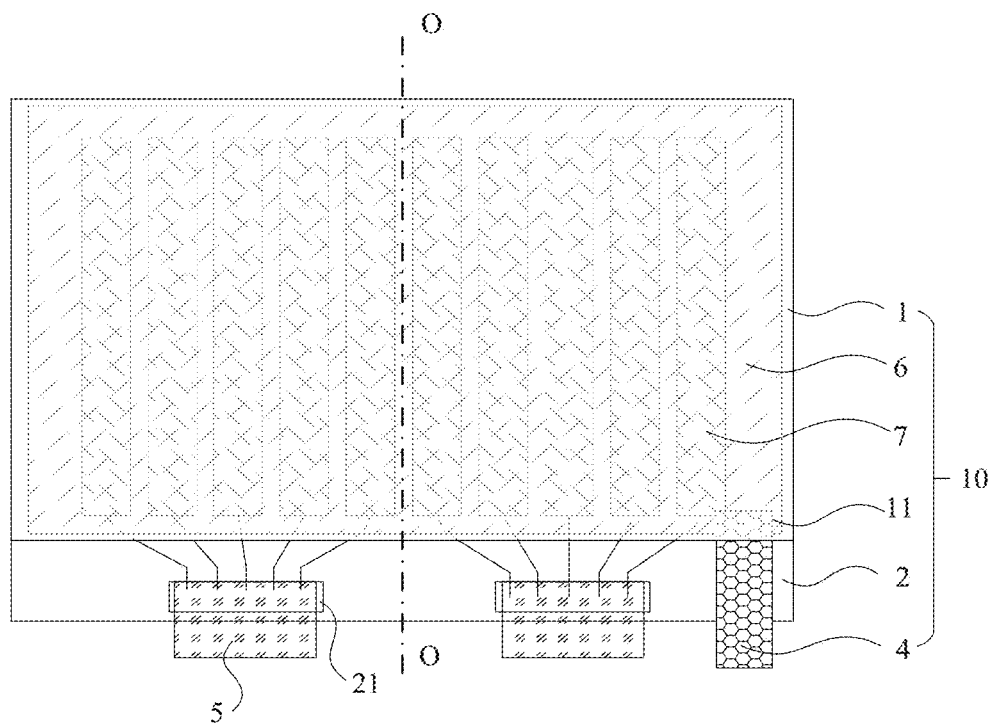
FIG. 8 is a schematic diagram of a structure of a first dimming structure provided by embodiments of the present disclosure.

Taking the first substrate 1 of the first dimming structure 10 laminated to the first substrate 1 of the second dimming structure 20, or the second substrate 2 of the first dimming structure 10 laminated to the second substrate 2 of the second dimming structure 20 as an example, assuming that the first substrate 1 is rectangular in shape and the length direction of the second electrode 7 is perpendicular to one side edge of the first substrate 1, in some embodiments, as shown in FIGS. 7 and 8, before the first dimming structure 10 and the second dimming structure 20 are laminated, the first substrate 1 of the first dimming structure 10 and the first substrate 1 of the second dimming structure 20 have respective notches at different end positions of side edges on a same side perpendicular to the length direction of the second electrode 7.

Figure 14:
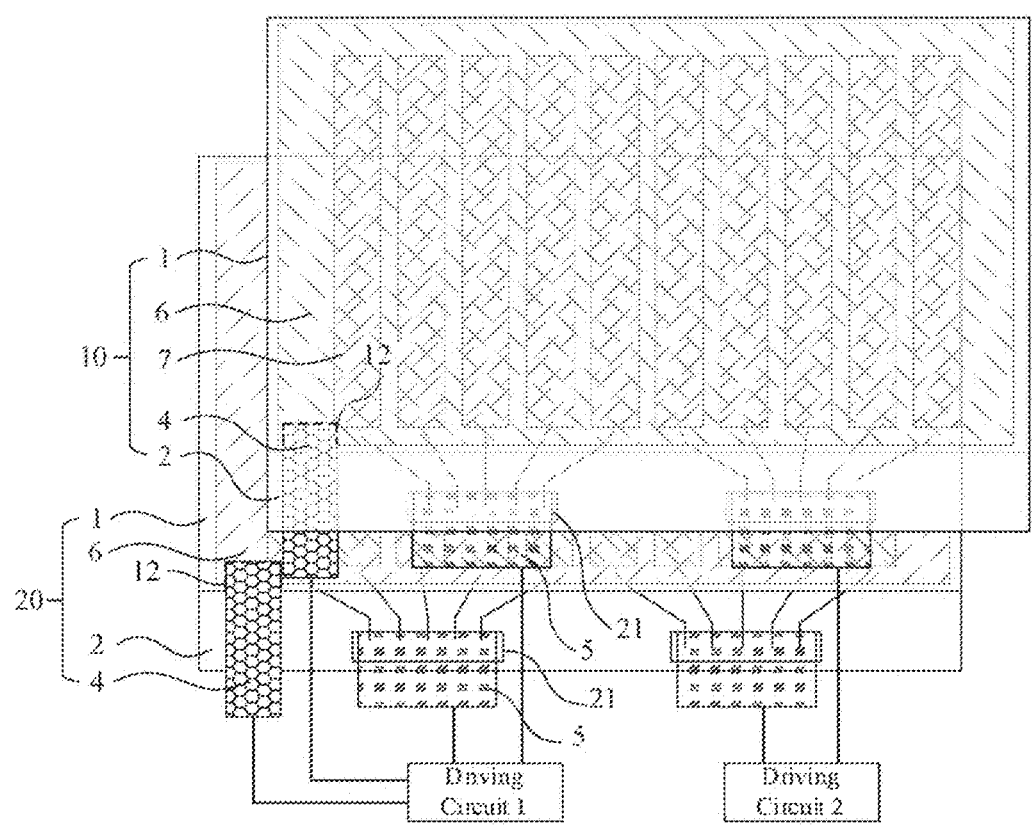
FIG. 14 is a schematic diagram of a structure of a dimming module provided by embodiments of the present disclosure.

In this way, after the first dimming structure 10 and the second dimming structure 20 are laminated in the above manner, the notch 12 of the first substrate 1 in the first dimming structure 10 and the notch 12 of the first substrate 1 in the second dimming structure 20 are located at the same end position on the same side as shown in FIG. 4 and FIG. 14, thus ensuring that there is an overlapping area of the two notches 12 in the thickness direction of the dimming module.

In other embodiments, before the first dimming structure 10 and the second dimming structure 20 are laminated, the first substrate 1 of the first dimming structure 10 and the first substrate 1 of the second dimming structure 20 have respective notches 12 at middle positions of side edges on different sides parallel to the length direction of the second electrode 7. Alternatively, the first substrate 1 of the first dimming structure 10 and the first substrate 1 of the second dimming structure 20 have respective notches 12 at the same end positions of side edges on different sides parallel to the length direction of the second electrode 7.

Figure 11:
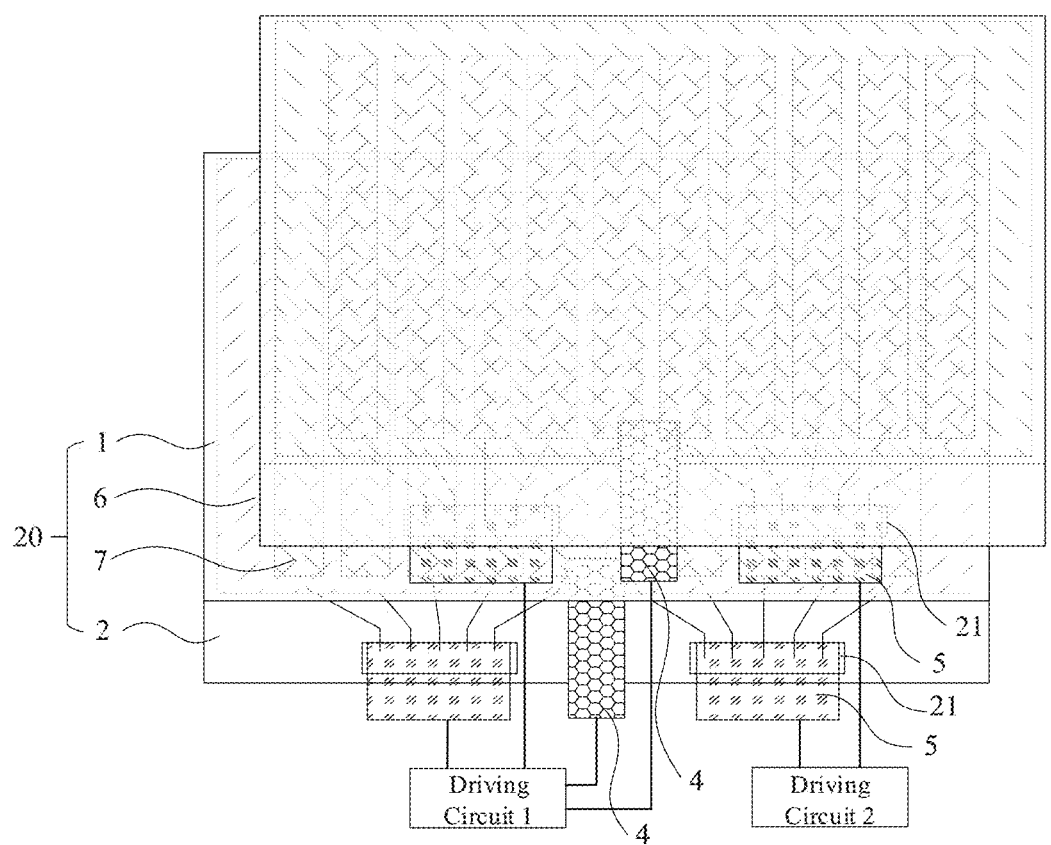
FIG. 11 is a schematic diagram of a structure of another dimming module provided by embodiments of the present disclosure.

In this way, after the first dimming structure 10 and the second dimming structure 20 are laminated in the above manner, the notch 12 of the first substrate 1 in the first dimming structure 10 and the notch 12 of the first substrate 1 in the second dimming structure 20 are located at the same position of the same side as shown in FIG. 11, thus ensuring that there is an overlapping area of the two notches 12 in the thickness direction of the dimming module.

For the above two ways of implementations, the position of the notch 12 on the first dimming structure 10 and the position of the notch 12 on the second dimming structure 20 are different, and therefore, the notch 12 on the first dimming structure 10 and the notch 12 on the second dimming structure 20 can be manufactured by two automated process production lines respectively.

Figure 9:
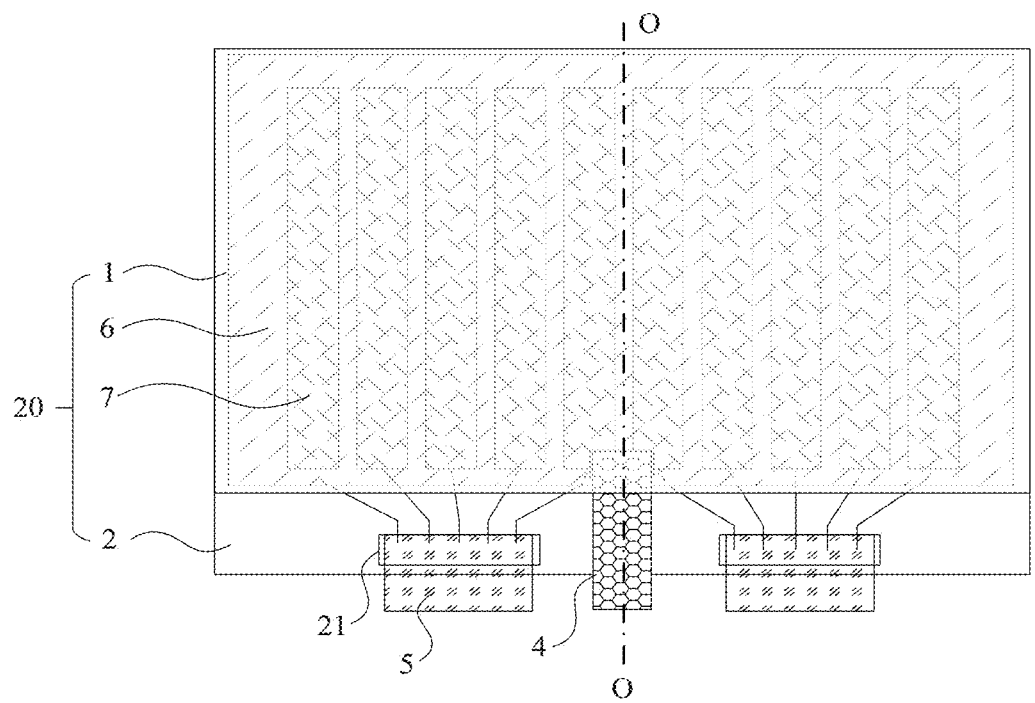
FIG. 9 is a schematic diagram of a structure of another second dimming structure provided by embodiments of the present disclosure.
Figure 10:
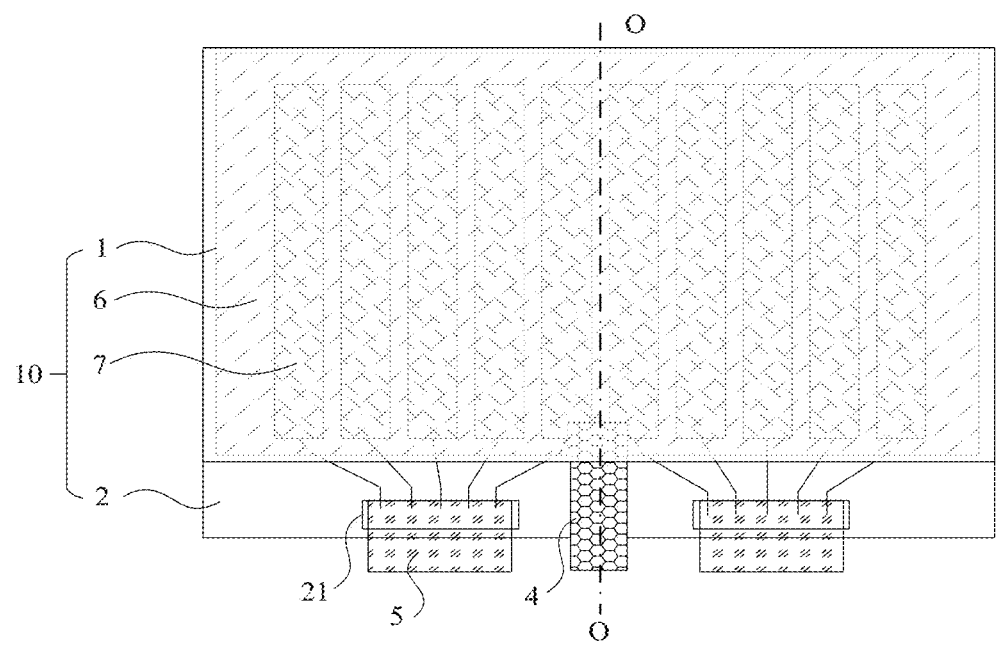
FIG. 10 is a schematic diagram of a structure of another first dimming structure provided by embodiments of the present disclosure.

In yet another embodiments, as shown in FIG. 9 or FIG. 10, before the first dimming structure 10 and the second dimming structure 20 are laminated, the first substrate 1 of the first dimming structure 10 and the first substrate 1 of the second dimming structure 20 have respective notches 12 at middle positions of side edges on a same side perpendicular to the length direction of the second electrode 7.

Figure 15:
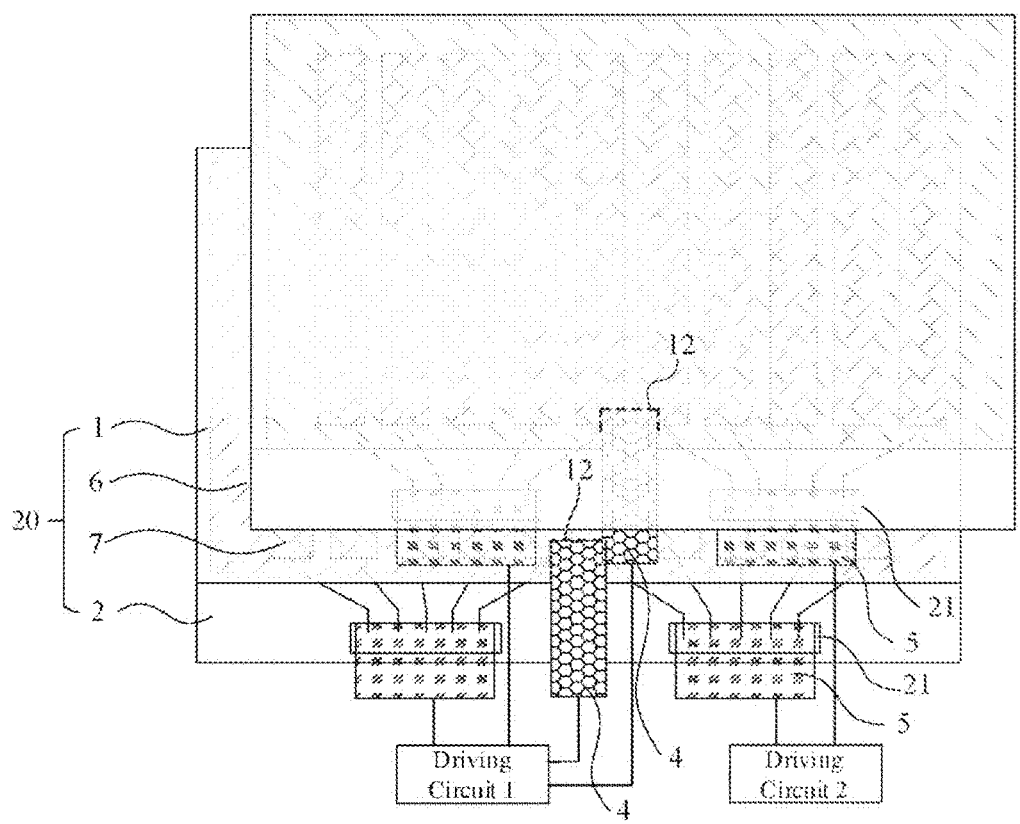
FIG. 15 is a schematic diagram of a structure of a dimming module provided by embodiments of the present disclosure.

In this way, as shown in FIG. 11 and FIG. 15, after the first dimming structure 10 and the second dimming structure 20 are laminated in the above manner, the notch 12 of the first substrate 1 in the first dimming structure 10 and the notch 12 of the first substrate 1 in the second dimming structure 20 are located in the middle of the same side, thus ensuring that there is an overlapping area of the two notches 12 in the thickness direction of the dimming module. For this implementation, the notches 12 on the dimming structures can be made by one automated process line because the position of the notch 12 on the dimming structure 10 and the position of the notch 12 on the second dimming structure 20 are the same.

In combined with the production of the orientation layer in the first dimming structure 10 and the orientation layer in the second dimming structure 20 as described in the above embodiments, the orientation angle of the orientation layer in the first dimming structure 10 and the orientation angle of the orientation layer in the second dimming structure 20 can be set to be the same in advance, and both are 45 degrees, in order to achieve the simplification of the dimming module production process, and the notches 12 on the dimming structures can be made in combination with the third way of implementation above. Thus, the first dimming structure 10 and the second dimming structure 20 can be produced by one automated process production line. In this case, the first dimming structure 10 and the second dimming structure 20 are provided only to facilitate the distinction between the two dimming structures in use, which does not mean that there is any difference in the specific structure of these two dimming structures.

Figure 12:
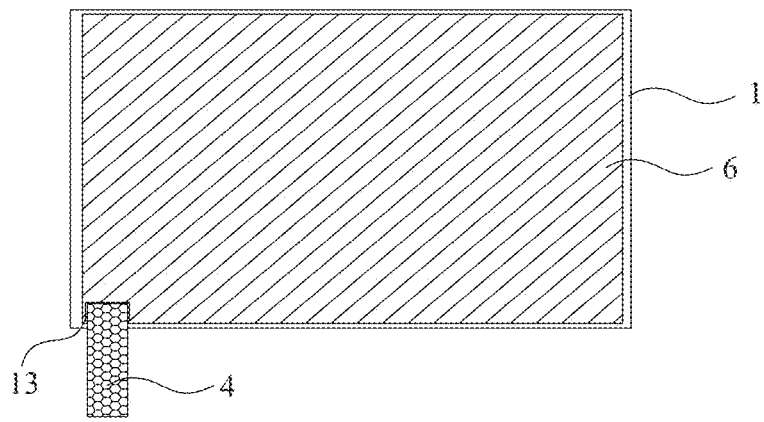
FIG. 12 is a schematic diagram of a structure of yet another first substrate provided by embodiments of the present disclosure.
Figure 13:
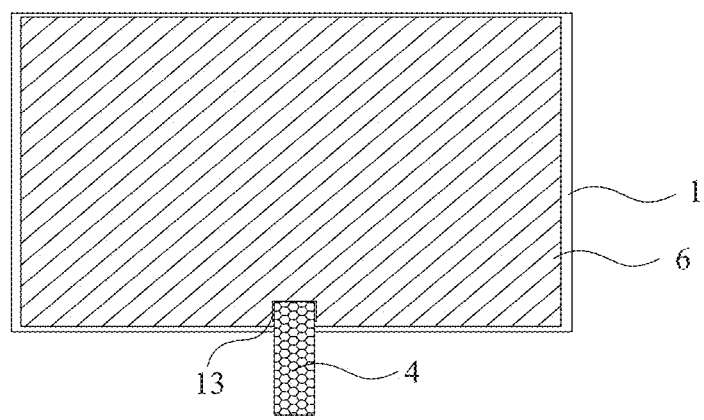
FIG. 13 is a schematic diagram of a structure of a further first substrate provided by embodiments of the present disclosure.

In some other embodiments, as shown in FIG. 12 or FIG. 13, the first substrate 1 has a blind hole 13 on the surface of the first substrate 1 close to the liquid crystal layer 3, the first electrode 6 covers the wall of the blind hole 13, the first substrate 1 forms the first binding area 11 within the blind hole 13, and one end of the first flexible circuit board 4 is bound within the blind hole 13.

The first substrate 1 and the second substrate 2 are bonded by insulating glue. In order to avoid the blind hole 13 from increasing the size of the first substrate 1, the blind hole 13 can be set in the area of the first substrate 1 to be coated with the insulating glue. After the first flexible circuit board 4 is bound in the blind holes 13, the first substrate 1 is bonded to the second substrate 2. In this way, the problem of increasing the size of the first substrate 1 due to the setting of the blind hole 13 is avoided. At the same time, due to the filling of the insulating glue inside the blind hole 13, it can play the role of extrusion, thus ensuring the binding effect of the first flexible circuit board 4.

When the first dimming structure 10 and the second dimming structure 20 are laminated, in order to ensure that there is an overlapping area between the area where the blind hole 13 on the first substrate 1 in the first dimming structure 10 and the area where the blind hole 13 on the first substrate 1 in the second dimming structure 20 in the thickness direction of the dimming module, the position of the blind hole 13 can be referred to the position of the notch 12 described in the above embodiments, which will not be repeated in the embodiments of the present disclosure.

The embodiments of the present disclosure further provide a method for manufacturing a dimming module, which is used to manufacture the dimming module described in the above embodiments. The method includes the following steps S10 to S20.

Step S10, manufacturing a first dimming structure and a second dimming structure.

Each of the first dimming structure and the second dimming structure includes a first substrate, a second substrate, a liquid crystal layer disposed between the first substrate and the second substrate, a first flexible circuit board, and a second flexible circuit board. The first substrate is provided with a first binding area, and a first electrode on one side of the first substrate facing the liquid crystal layer. The first electrode is a planar structure in one piece. One end of the first flexible circuit board is bound to the first binding area to be electrically connected to the first electrode The second substrate is provided with a second binding area, and a plurality of second electrodes distributed in an array on one side of the second substrate facing the liquid crystal layer. The plurality of second electrodes extend in a column direction. One end of the second flexible circuit board is bound to the second binding area to be electrically connected to the plurality of the second electrodes.

Step S20, laminating and bonding the first dimming structure and the second dimming structure, where, in a lamination direction, the plurality of second electrodes in the first dimming structure are in a one-to-one correspondence with the plurality of second electrodes in the second dimming structure.

In the embodiments of the present disclosure, the dimming module can simplify the connection with the driving circuit, and the problem of misalignment of the electrical connection points of the plurality of second electrodes of the first dimming structure and the plurality of second electrodes of the second dimming structure can be avoided, thereby facilitating the synchronous drive regulation of the two second electrodes corresponding to each other of the first dimming structure and the second dimming structure, and improving the dimming effect of the dual dimming structure. In addition, the first substrate is provided with a separate first binding area, avoiding to set the conductive adhesive on the first substrate and the second substrate, so that the area occupied by the first electrode and the second electrode can be appropriately increased, which in turn increases the dimming area of the dimming structure.

In the following description, taking the first dimming structure as an example, since only the first substrate in the first dimming structure is adjusted, the manufacturing process of the first substrate is mainly used to explain the manufacturing process of the first dimming structure.

In some embodiments, in combination with an example of the first substrate having a notch on the edge as described in the above embodiments, the method includes: manufacturing a first dimming assembly; providing a notch in an edge of the first substrate to obtain the first binding area; binding one end of the first flexible circuit board within the notch to electrically connect the first flexible circuit board to the first electrode; and binding the second flexible circuit board to the second binding area to electrically connect the second flexible circuit board to the plurality of second electrodes to obtain the first dimming structure.

The first dimming assembly includes the first substrate, the second substrate, and the liquid crystal layer disposed between the first substrate and the second substrate. The second substrate is provided with a second binding area.

In some other embodiments, in combination with an example of the first substrate having a blind hole on the surface close to the liquid crystal layer as described in the above embodiments, the method includes: etching a blind hole on a surface of the first substrate; forming the first electrode on the surface of the first substrate having the blind hole to obtain the first binding area, the first electrode covering a wall of the blind hole; binding one end of the first flexible circuit board in the blind hole to electrically connect the first flexible circuit board to the first electrode; manufacturing the second substrate on one side of the first substrate close to the first electrode, and manufacturing a liquid crystal molecule between the first substrate and the second substrate, the second substrate being provided with the second binding area; and binding the second flexible circuit board to the second binding area to electrically connect the second flexible circuit board to the plurality of second electrodes to obtain the first dimming structure.

The embodiments of the present disclosure further provide a dimming glass that includes a first glass panel and a second glass panel, and the dimming module disposed between the first glass panel and the second glass panel as described in the above embodiments.

In combined with the above embodiments, the dimming glass can simplify the connection with the driving circuit, and the problem of misalignment of the electrical connection points of the plurality of second electrodes of the first dimming structure and the plurality of second electrodes of the second dimming structure can be avoided, thereby facilitating the synchronous drive regulation of the two second electrodes corresponding to each other of the first dimming structure and the second dimming structure, and improving the dimming effect of the dual dimming structure. In addition, the first substrate is provided with a separate first binding area, avoiding to set the conductive adhesive on the first substrate and the second substrate, so that the area occupied by the first electrode and the second electrode can be appropriately increased, which in turn increases the dimming area of the dimming glass.

Other embodiments of the present disclosure will readily occur to those skilled in the art upon consideration of the specification and practice of the application disclosed here. This application is intended to cover any variations, uses, or adaptations of the present disclosure that follow the general principles of the present disclosure and include well-known knowledge or common technical means in the art not disclosed by the present disclosure. The specification and embodiments are to be regarded as exemplary only, with the true scope and spirit of the present disclosure being indicated by the appended claims.

What is claimed is:

1. A dimming module, comprising a first dimming structure and a second dimming structure distributed in a laminated manner, wherein
each of the first dimming structure and the second dimming structure comprises: a first substrate, a second substrate, a liquid crystal layer between the first substrate and the second substrate, a first flexible circuit board, and a second flexible circuit board; wherein
the first substrate is provided with a first binding area, and a first electrode on one side of the first substrate facing the liquid crystal layer, the first electrode being a planar structure in one piece, one end of the first flexible circuit board being bound to the first binding area to be electrically connected to the first electrode; and
the second substrate is provided with a second binding area, and a plurality of second electrodes distributed in an array on one side of the second substrate facing the liquid crystal layer, the plurality of second electrodes extending in a column direction, one end of the second flexible circuit board being bound to the second binding area to be electrically connected to the plurality of second electrodes; and
wherein, in a lamination direction, the plurality of second electrodes in the first dimming structure are in a one-to-one correspondence with the plurality of second electrodes in the second dimming structure;
wherein the first dimming structure comprises a plurality of second flexible circuit boards; and
the second substrate is provided with a plurality of second binding areas in a one-to-one correspondence with the plurality of second flexible circuit boards, the plurality of second electrodes being divided into a plurality of groups of second electrodes in a one-to-one correspondence with the plurality of second flexible circuit boards, one second flexible circuit board among the plurality of second flexible circuit boards being bound to the corresponding second binding area to be electrically connected to the corresponding group of second electrodes.

2. The dimming module of claim 1, wherein the first substrate of the first dimming structure is on one side of the first dimming structure close to the second dimming structure, and the first substrate of the second dimming structure is on one side of the second dimming structure close to the first dimming structure; or
the first substrate of the first dimming structure is on one side of the first dimming structure away from the second dimming structure, and the first substrate of the second dimming structure is on one side of the second dimming structure away from the first dimming structure.

3. The dimming module of claim 1, wherein the first substrate has a notch at an edge of the first substrate, the first substrate forming the first binding area at the notch, and one end of the first flexible circuit board being bound within the notch.

4. The dimming module of claim 3, wherein the first substrate is rectangular in shape, and the second electrode has a length direction perpendicular to one side edge of the first substrate; and
the first substrate of the first dimming structure and the first substrate of the second dimming structure have respective notches at same end positions of side edges on a same side perpendicular to the length direction of the second electrode.

5. The dimming module of claim 3, wherein the first substrate is rectangular in shape, and the second electrode has a length direction perpendicular to one side edge of the first substrate; and
the first substrate of the first dimming structure and the first substrate of the second dimming structure have respective notches at middle positions of side edges on a same side perpendicular to the length direction of the second electrode.

6. The dimming module of claim 1, wherein the first substrate has a blind hole on a surface of the first substrate close to the liquid crystal layer, the first electrode covering a wall of the blind hole, the first substrate forming the first binding area within the blind hole, and one end of the first flexible circuit board being bound within the blind hole.

7. The dimming module of claim 1, wherein the plurality of second flexible circuit boards, to which the plurality of groups of second electrodes in the first dimming structure are connected, are configured to electrically connect to different driving circuits; and
    second flexible circuit boards connected to two groups of second electrodes are configured to a same driving circuit, the two groups of second electrodes in the first dimming structure and the second dimming structure, respectively, and corresponding to each other.

8. A dimming glass, comprising a dimming module comprising a first dimming structure and a second dimming structure distributed in a laminated manner, wherein
    each of the first dimming structure and the second dimming structure comprises: a first substrate, a second substrate, a liquid crystal layer between the first substrate and the second substrate, a first flexible circuit board, and a second flexible circuit board; wherein
        the first substrate is provided with a first binding area, and a first electrode on one side of the first substrate facing the liquid crystal layer, the first electrode being a planar structure in one piece, one end of the first flexible circuit board being bound to the first binding area to be electrically connected to the first electrode; and
        the second substrate is provided with a second binding area, and a plurality of second electrodes distributed in an array on one side of the second substrate facing the liquid crystal layer, the plurality of second electrodes extending in a column direction, one end of the second flexible circuit board being bound to the second binding area to be electrically connected to the plurality of the second electrodes; and
    wherein, in a lamination direction, the plurality of second electrodes in the first dimming structure are in a one-to-one correspondence with the plurality of second electrodes in the second dimming structure;
    wherein the first dimming structure comprises a plurality of second flexible circuit boards; and
    the second substrate is provided with a plurality of second binding areas in a one-to-one correspondence with the plurality of second flexible circuit boards, the plurality of second electrodes being divided into a plurality of groups of second electrodes in a one-to-one correspondence with the plurality of second flexible circuit boards, one second flexible circuit board among the plurality of second flexible circuit boards being bound to the corresponding second binding area to be electrically connected to the corresponding group of second electrodes.

9. The dimming glass of claim 8, wherein the first substrate of the first dimming structure is on one side of the first dimming structure close to the second dimming structure, and the first substrate of the second dimming structure is on one side of the second dimming structure close to the first dimming structure; or
    the first substrate of the first dimming structure is on one side of the first dimming structure away from the second dimming structure, and the first substrate of the second dimming structure is on one side of the second dimming structure away from the first dimming structure.

10. The dimming glass of claim 8, wherein the first substrate has a notch at an edge of the first substrate, the first substrate forming the first binding area at the notch, and one end of the first flexible circuit board being bound within the notch.

11. The dimming glass of claim 10, wherein the first substrate is rectangular in shape, and the second electrode has a length direction perpendicular to one side edge of the first substrate; and
    the first substrate of the first dimming structure and the first substrate of the second dimming structure have respective notches at same end positions of side edges on a same side perpendicular to the length direction of the second electrode.

12. The dimming glass of claim 10, wherein the first substrate is rectangular in shape, and the second electrode has a length direction perpendicular to one side edge of the first substrate; and
    the first substrate of the first dimming structure and the first substrate of the second dimming structure have respective notches at middle positions of side edges on a same side perpendicular to the length direction of the second electrode.

13. The dimming glass of claim 8, wherein the first substrate has a blind hole on a surface of the first substrate close to the liquid crystal layer, the first electrode covering a wall of the blind hole, the first substrate forming the first binding area within the blind hole, and one end of the first flexible circuit board being bound within the blind hole.

14. The dimming glass of claim 8, wherein the plurality of second flexible circuit boards, to which the plurality of groups of second electrodes in the first dimming structure are connected, are configured to electrically connect to different driving circuits; and
    second flexible circuit boards connected to two groups of second electrodes are configured to a same driving circuit, the two groups of second electrodes in the first dimming structure and the second dimming structure, respectively, and corresponding to each other.

\* \* \* \* \*